INVENTOR
BEN S. MELTON

INVENTOR
BEN S. MELTON

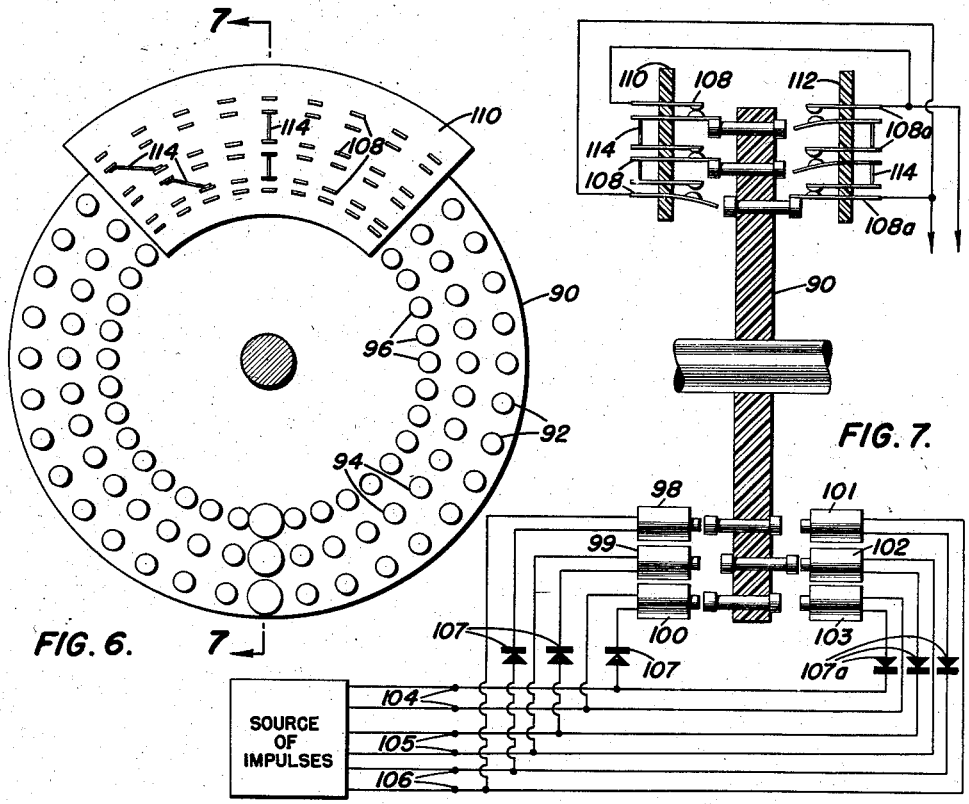
FIG. 6.
FIG. 7.
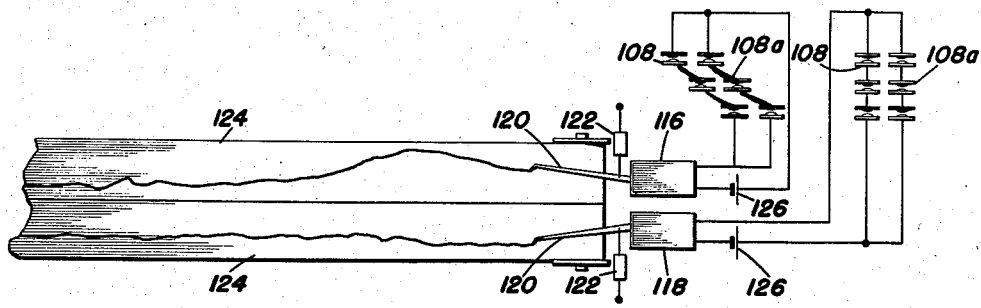
FIG. 8.
INVENTOR
BEN S. MELTON

United States Patent Office 2,897,351
Patented July 28, 1959

2,897,351

APPARATUS FOR TESTING FOR THE EXISTENCE OF SIGNALS IN THE PRESENCE OF OVERRIDING NOISE

Ben S. Melton, Bethesda, Md.

Application March 2, 1953, Serial No. 339,817

8 Claims. (Cl. 250—20)

The present invention relates to an improved method and apparatus for testing for the existence of signals in the presence of overriding noise. More specifically, the invention is concerned with a process and means for securing useful information by the mutual comparison of two or more signals having amplitudes below that of an existing noise level, by determining polarity coincidences of such signals and recording such coincidences.

The routine examination of a large quantity of data from several electrical detectors, for the purpose of determining the correlatability of wave forms or the presence of a coherent signal in a noise background is so time consuming and fatiguing that there are great possibilities of overlooking signals of interest. Moreover, systems in use up to the present time depend upon the results obtained by the combination of a number of signals into one; that is, they depend upon the fact that proper phase addition of several signals in noise background of random phase will result in the delivery of a signal much greater than the accompanying background noise, but the improvement in signal-to-noise amplitude ratio by this method is limited to a factor proportional to the square root of the number of detectors and thus severely restricts its usefulness where the number of detectors is limited, which is the case in the majority of practical applications.

It should be noted, furthermore, that in systems developed up to the present, the output signal is of the nature of the input signal. That is, in the usual methods of combining signals, the amplitudes are important.

One of the principal objects of the present invention, therefore, is to provide a method and apparatus for testing for the existence of signals which will function to record the existence of any such signals in a noise background by comparison of said signals on a polarity basis alone.

Another object of the invention resides in the provision of a method and apparatus for the above-mentioned purpose which does not depend upon substantial signal amplitudes for its operation.

A further object is to provide a method and apparatus for detecting the presence of a signal in a noise background, wherein the apparatus employed may conveniently consist of a simple and compact arrangement of conventional components.

Further objects of the invention will become evident after consideration of the following description.

In the drawings forming a part of this application:

Fig. 6 is an elevation showing a modified (electro-mechanically operated) embodiment of the invention;

Fig. 7 is a section, on the line 7—7 of Fig. 6, and showing additionally the electrical connections for the read-out and recorder system;

Fig. 8 is a schematic view showing the recorder stylii, their associated damping devices, the tape and the associated switch circuitry, all coordinating to record the information derived from operation of the electro-mechanical system shown in Figs. 6 and 7.

Figure 1:
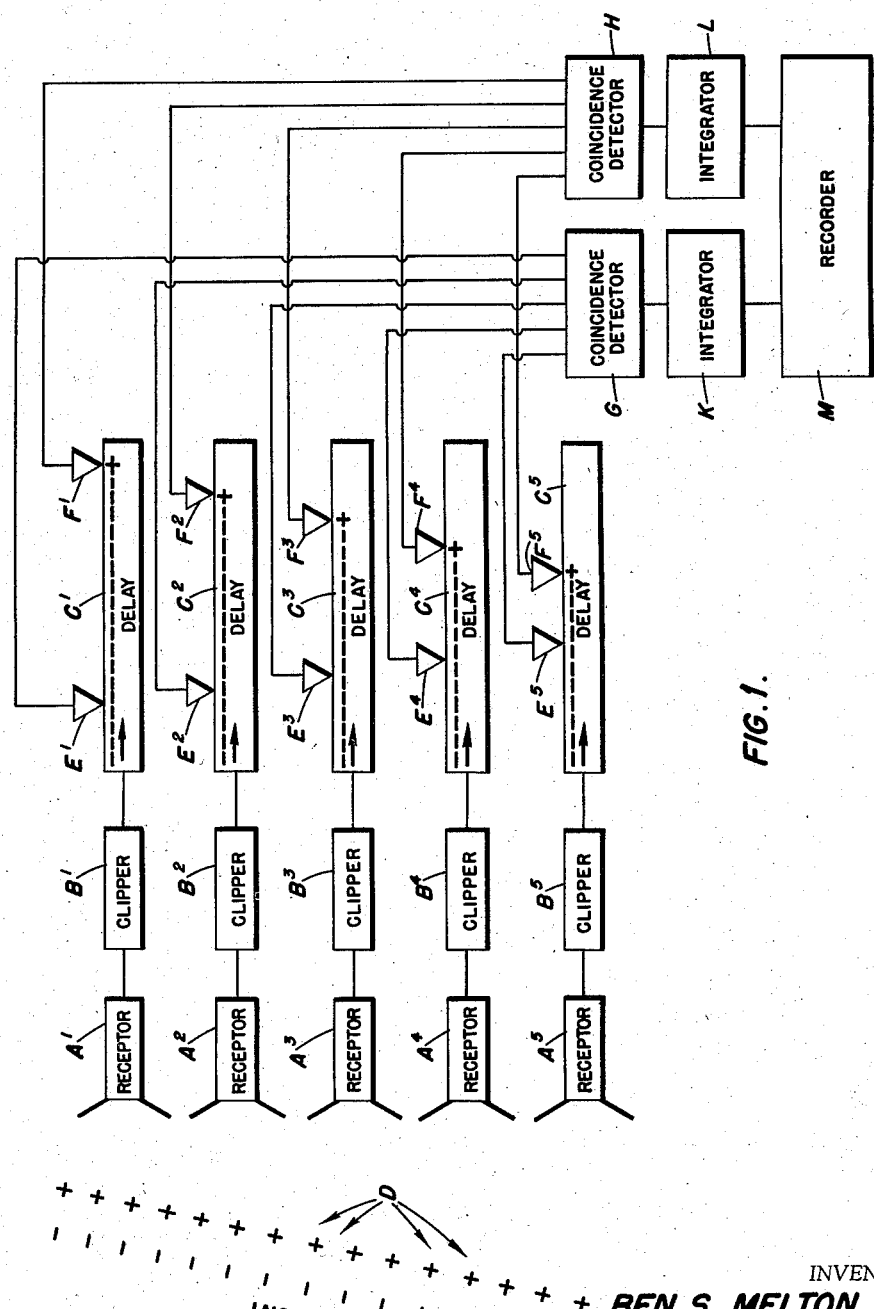
Fig. 1 is a block diagram of a modification of the invention utilizing five receptors.

The present invention provides a method and apparatus for determining, by recording multiple coincidences of field polarities at several receptors, the existence of a signal below the general noise level.

Let it be supposed that there are available several receptor channels, each containing electrical noise and coherent signal content, but perhaps with various time shifts in the channels. Such an arrangement might be obtained, for example, by placing a number of receptors in an electromagnetic field containing both coherent signal and noise. The time shifts of the signal in the various channels will be related to the geometric pattern of the (coherent) field.

To test for the presence of signals it is first supposed for simplicity that the signal is of the same amplitude in each channel; then the instantaneous amplitudes of the signals in the several channels will tend to be the same. This tendency will be counteracted to some extent by the presence of noise. Moreover, regardless of the effect of noise, there will be a strong tendency for the signal polarities to agree. Thus, the system of the present invention contemplates comparing the instantaneous signs, rather than amplitudes, of signals and noise in the various channels. It has been found that little information is lost by considering only signal polarities. This comparison of signs in the several channels is made at regular intervals and the number of instances in which all signs are in agreement is recorded. If, over a given period the number of coincidences is high compared to the number to be expected with only noise in the channels, this condition is considered as evidence of a signal.

If a progressive phase exists between signals in various channels, corresponding to signals from the same source but shifted in time relative to signals in the said channels, then the number of coincidences will be decreased. This condition may be compensated for by incorporating time delays in the receptor channels between the receptors and the coincidence detectors employed. When testing for signal polarity coincidences with several sets of time delays, a large number of coincidences with a given set of time delays would indicate the presence of a signal.

The operation of the system of the present invention may be compared generally with the procedure utilized in determining when a "reflection" exists on a record taken in seismic prospecting, assuming for the comparison that a "reflection" and a coherent signal are the same. In seismic prospecting it is well known that adding independent signals to the point of forming only one oscillographic trace on a record is not a satisfactory means of establishing the existence of a reflection. It is the comparison of a number of traces which establishes the reflection existence. Addition of signal amplitudes from several channels, even though it may produce a cyclic phenomena resembling a reflection signal, does not establish the existence of the reflection (coherence), since a very strong signal on any channel could produce the same result. If this reasoning is extended to include the mental process for comparing several signals, when a number of oscillographic traces on the same record can be examined, it will be found that coincidences of polarity are relied upon because signal amplitudes in the presence of over-riding noise are practically useless.

In the light of the foregoing discussion, it will be understood that the present invention provides a method and apparatus for obtaining a useful indication which is related to the mutual correlation of a plurality of signals. The apparatus employed in one embodiment of the invention will now be described with reference to the drawings.

In Fig. 1, five receptors $A^1$, $A^2$, $A^3$, $A^4$ and $A^5$ are connected respectively to polarity indicators, conveniently clippers, $B^1$, $B^2$, $B^3$, $B^4$ and $B^5$. Delay lines $C^1$–$C^5$, inclusive, are connected to their respective indicators $B^1$–$B^5$. An advancing coherent signal wave front is shown at D, the rows of plus and minus signs indicating that the incoming field is alternating, but not necessarily sinusoidally. The delay lines $C^1$–$C^5$, inclusive, need receive from the receptors and indicators only the signal polarities. Sets of read-out devices, to be discussed in more detail in the description of Fig. 2 hereinafter, are shown at $E^1$–$E^5$, inclusive, and $F^1$–$F^5$, inclusive. These sets of read-out devices function to "pick-off" delayed signals from the delay lines $C^1$–$C^5$. The read-out devices may take the form of amplifiers or cathode followers of standard design, and function to prevent loading of said delay lines. In Fig. 1 the read-out devices $E^1$–$E^5$ and $F^1$–$F^5$ are "slanted" so as to be receptive to wave fronts arriving at the receptors in timed succession. Specifically, in Fig. 1 the devices $F^1$–$F^5$ would be receptive to the wave front D.

Figure 2:
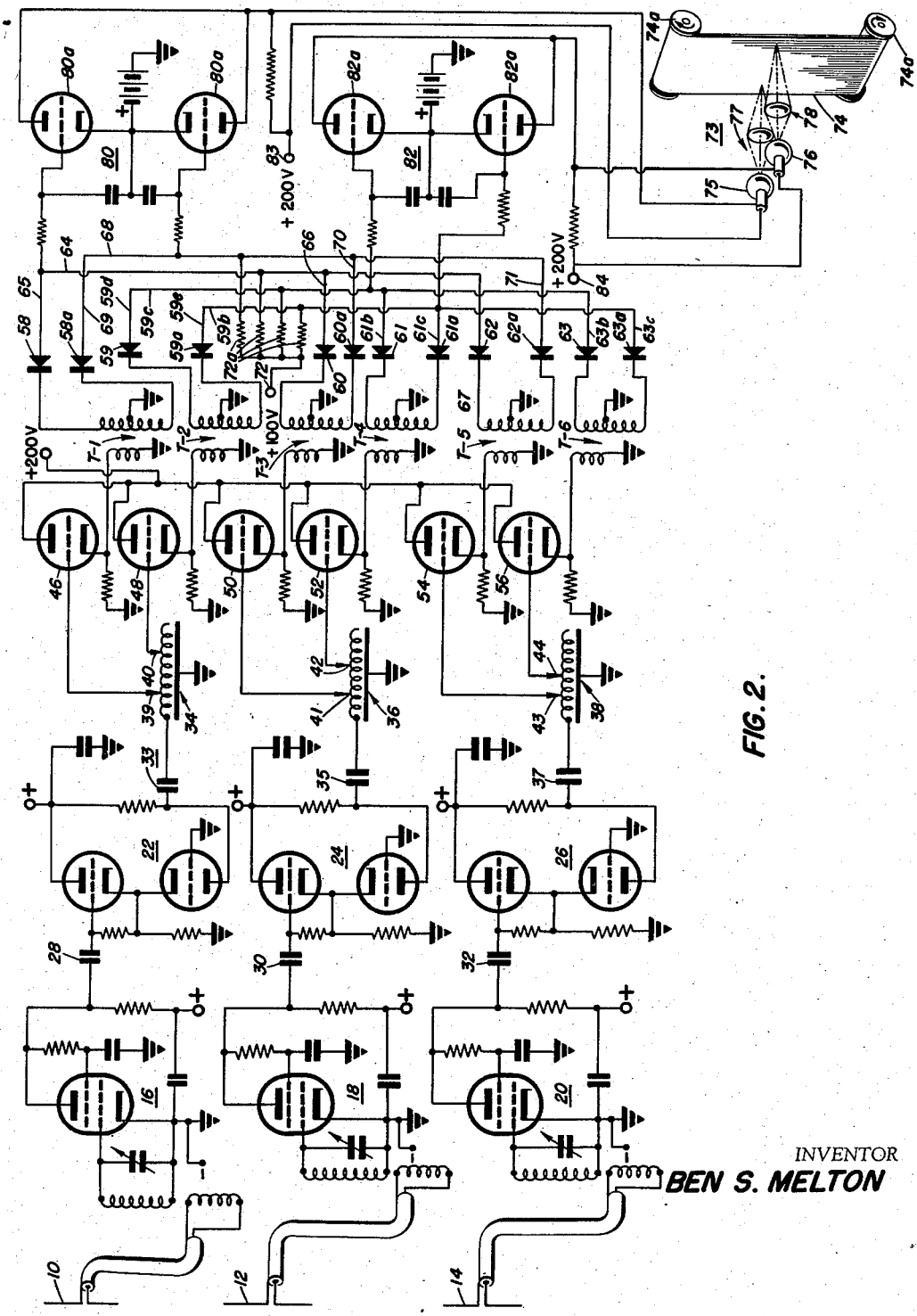
Fig. 2 is a schematic view of a simple form of the invention.

From the read-out devices the signals are conducted to coincidence detectors G and H, the devices $E^1$ and $E^5$ being connected to the detector G and the devices $F^1$ and $F^5$ to the detector H. Satisfactory coincidence detectors are shown in Fig. 2 and will be discussed in detail during the explanation of that view of the drawings. Outputs of the detectors G and H are fed to integrators K and L, respectively, which integrators may be of the R–C or Miller type. The integrators are connected to a suitable dual recorder M.

The coincidence detector connected to the appropriate read-out devices ($F^1$–$F^5$ in Fig. 1) will deliver a pulse each time a coincidence of signs from the wave front occurs, the appropriate integrator (L in Fig. 1) will sum these pulses for any predetermined interval, and the resultant will appear as an amplitude in a channel of the recorder. The final record will thus be a time summation of signal polarity coincidence, the amplitude being a statistical measure of the signal coherence.

In Fig. 1, only two recording channels are indicated. However, it will be obvious from the foregoing that only those read-out devices which are properly located along the delay lines will deliver coincident signs for any given direction of wave propagation, so that it is necessary to provide as many recording channels as there are separate examinations of wave front directions, i.e., angular positions of the wave fronts with respect to the several receptors, if simultaneous processing is desired. If more convenient for practical purposes, the positions of the delay lines and the polarity indicators may be interchanged. If this is done the delay lines much carry signal amplitudes, but flexibility of the system will be improved.

From the description of Fig. 1, it will be understood that if during a predetermined time interval, a number of coincidences of sign are found in the recorder channels, deviating greatly from the number to be expected from pure noise, it can be inferred that coherent signals are present in said channels.

Reference is now made to Fig. 2, wherein there is shown schematically a system employing three receptors and associated indicators (clippers), delay lines, coincidence detectors and recording channels. It is believed that a three receptor system is the simplest practical system utilizing the principles of the present invention. It is possible to use but two receptors but the sampling of the wave front would not give a useful representation of signal coincidence as against noise. Five receptors, as shown in Fig. 1, or an even greater number, would be mode effective in practical use than the three shown in Fig. 2, but said system of Fig. 2 has been illustrated mainly for the sake of simplicity.

In Fig. 2, three conventional dipole antennas are shown at 10, 12, and 14. These antennas are connected, by coaxial cables, to the antenna, or input, coils of radio frequency amplifiers 16, 18, and 20. The amplifiers are entirely conventional, so that a detailed explanation of them is not believed to be necessary. The amplifiers 16, 18, and 20 are coupled to clippers (indicators) 22, 24 and 26, respectively, by capacitors 28, 30 and 32 and appropriate conductors. The clippers each include a pair of triodes arranged conventionally for clipping both positive and negative pulses, to limit signal (and noise) from the amplifiers 16, 18 and 20 to a level which will not overload the remainder of the system, to be described hereinafter, but will be adequate to "indicate" the electrical polarities of said signal and noise, since according to the invention the polarities constitute the only information utilized in determining the presence of a signal in an oncoming wave front.

Delay lines 34, 36 and 38 are coupled to the clippers 22, 24 and 26 through appropriate coupling capacitors 33, 35 and 37. The delay lines each consist of an inductance capacitively coupled, along its length, to ground, and function conventionally.

Two take off taps are provided for each of the delay lines 34, 36 and 38. The taps for the delay line 34 are indicated at 39 and 40, those for the line 36 at 41, 42, and those for delay line 38 at 43, 44. In Fig. 2, taps 39, 41 and 43 are arranged to contact their respective delay lines at the same points with respect to the nearest ends of the lines, so as to present a "straight" (or time coincident) front, to be receptive to a wave front striking all of the antennas simultaneously. The taps 40, 42 and 44, however, are arranged to tap their respective lines at different points, to be receptive to a "slanted" wave front, such as the wave front D in Fig. 1. That is, the electrical noise (and signal if any is present) from wave front D will first strike the antenna 10 and after passing through amplifier 16 and clipper 22, will enter the delay line 34. Because tap 40 is connected near the open end of said delay line 34, a relatively long delay of the noise (and signal) will be effected. Taps 42 and 44 are connected to their respective delay lines 36 and 38 at points progressively more remote from the open ends of said lines, for imposing progressively shorter delays. Thus it will be seen that signal and noise impinging on the antennas 10, 12 and 14 from a "slanted" wave front, such as D in Fig. 1, will appear simultaneously at taps 40, 42 and 44. As previously pointed out, because of the provision of the clippers 22, 24 and 26, the signal and noise will possess negligible amplitude but definite positive and/or negative polarities.

The taps of each of the delay lines 34, 36 and 38 are connected to the grid electrode of a triode functioning as a cathode follower. More specifically, taps 39 and 40 are connected, respectively, to the grids of triodes 46 and 48, taps 41 and 42 to grids of triodes 50 and 52, and taps 43 and 44 to the grids of triodes 54 and 56. The cathodes of the cathode follower triodes are connected to coupling transformers T–1, T–2, T–3, T–4, T–5, and T–6, each of said transformers including a primary and a center-tapped secondary. That is, the cathode of triode 46 is connected to one terminal of the primary of transformer T-1, the other terminal of said primary being grounded. The cathodes of triodes 48, 50, 52, 54 and 56 are similarly connected to the primaries of transformers T-2, T-3, T-4, T-5 and T-6.

The secondaries of transformers T-2 through T-6 are center-tapped to ground and each of their remaining terminals is connected to one terminal (negative) of a crystal diode. The crystal diodes are indicated at 58 and 58a, for the secondary of transformer T-1, 59 and 59a for that of T-2, 60 and 60a for T-3, 61 and 61a for T-4, 62 and 62a for T-5, and 63 and 63a for T-6. The positive terminals of diodes 58, 60 and 62 are interconnected by conductors 64, 65, 66 and 67, and like terminals of diodes 58a, 60a and 62a are connected to each other by conductors 68, 69, 70 and 71. The diodes 58 and 58a, 60 and 60a, and 62 and 62a constitute a coincidence detector, well known in electronic computers, and function, in a manner to be described in more detail hereinafter, to conduct noise (and signals when present) appearing at delay line take-off taps 39, 41 and 43. Signals appearing at take-off taps 40, 42 and 44 are conducted by diodes 59, 59a, 61, 61a, and 63, 63a, in a manner also to be described presently, these diodes also constituting a coincidence detector. More specifically, conductors 59b and 59c, 59d, 59e, 61b, 61c, and 63b and 63c interconnect the diodes 59, 59a, 61, 61a, and 63, 63a.

In order to impress a positive bias on the diodes of the coincidence detectors, a potential of 100 volts (source not shown) is connected to a terminal 72. From the terminal 72 connections to conductors 59b, 59c, 64 and 68 through resistors 72a each having a value of the order of 0.2 megohm.

In Fig. 2 a two channel recorder for providing a useful indication of the outputs of the coincidence detectors is shown generally at 73. The recorder 73 includes a film strip 74 which is trained about rollers 74a rotated by any suitable means. To expose the film in a manner to produce records such as those shown in Figs. 3, 4 and 5, a pair of lamps are shown at 75, 76 and associated lens systems at 77, 78. The recorder 72 is coupled to the coincidence detectors previously described by amplifiers 80 and 82, each including a pair of triodes 80a and 82a with their grids coupled to the diodes of the coincidence detectors and their anodes connected in parallel and to said lamps 75, 76 and to positive high voltage terminals 83 and 84. Resistors 85 and 86 are connected in parallel with lamps 75 and 76 to provide the necessary voltage drop across the lamps.

The operation of the invention, particularly as illustrated in Figs. 2 through 5, will now be described. Noise (and signals if any are present) from an oncoming wave front will impinge upon the antennas 10, 12 and 14 and will be built up and clipped, respectively, by the amplifiers 16, 18 and 20 and the indicators (clippers) 22, 24 and 26, and fed to the delay lines 34, 36 and 38. Signals (and noise) striking the antennas simultaneously, as from a directly oncoming wave front, will be picked off the delay lines by taps 39, 41 and 43 and conducted through triodes 46, 50 and 54 to the coincidence detector constituted by diodes associated with the transformers T-1, T-3 and T-5. These diodes, 58, 58a, 60, 60a, and 62, 62a, are biased by the positive voltage connected to the terminal 72 through the resistors 72a. With this arrangement, the voltage which controls the grids of the tubes 80a is conducted to ground through the grounded center tapped secondaries of transformers T-1, T-3 and T-5 and their associated diodes, until such time as positive pulses appear simultaneously at diodes 58, 60 and 62, or simultaneously at diodes 58a, 60a and 62a. In the absence of any such positive pulses, plate current will not flow in tubes 80a and lamp 75 will not be illuminated. If, however, impulses of the same polarity are impressed on the diodes of this coincidence detector, the bias on the grids of triodes 80 and 80a will be overcome and plate current will flow, thus illuminating the lamp 75 for the duration of the impulse on the film strip 74.

Signals and noise picked off the delay lines 34, 36 and 38 by taps 40, 42 and 44, as from an incoming wave front "slanted" with respect to the antennas 10, 12 and 14 (as shown at D in Fig. 1), will be conducted, through cathode follower triodes 48, 52 and 56, to the coincidence detector including transformers T-2, T-4 and T-6 and their associated diodes 59, 59a, 61, 61a and 63, 63a, and thence to the grids of triodes 82a. The triodes 82a are biased as are triodes 80a, so that when an impulse is impressed on their grids, plate current will flow and lamp 76 will be illuminated, for making a record of said impulse.

For the sake of simplicity of explanation, only two outputs for each delay line have been shown, particularly since each delay line output requires a coincidence detector and recorder. A more complete and realistic survey of oncoming wave fronts can be made if several time delay outputs (and coincidence detector-recorder systems) are employed; that is, as many wave fronts, angularly disposed with respect to the antennas 10, 12 and 14, as there are delay line outputs, may be simultaneously examined. The use of more than three antennas and receptors will also contribute materially to the completeness of the wave front examinations.

It is desired particularly to emphasize that the essence of the present invention resides in the provision of a system for examining a wave front to determine the presence of a coherent signal below the general noise level, and that this is done by determining, on the basis of polarity coincidences of incoming impulses rather than by the amplitudes of said impulses, the presence of such a coherent signal. For a given wave front only those impulses which are polarity coincident will result in producing a record on the film 74. While it is of course true that noise alone will produce random polarity coincidences, it can be determined from a comparison of several film records the existence of a coherent signal, by a tendency toward polarity agreement. Thus, if over a given period of time the number of polarity coincidences is high compared with the number of such coincidences to be expected with only noise in the channels, there is strong evidence of the presence of a signal.

Figure 3:
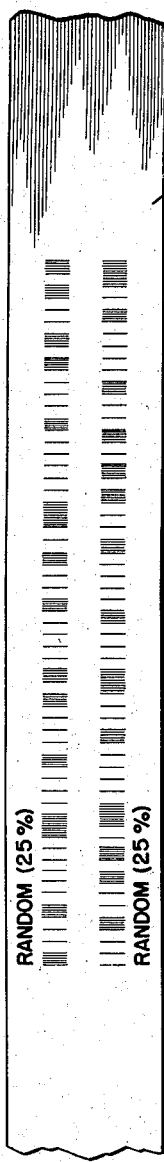
Fig. 3 is a diagrammatic representation of a length of recording tape, from the recorder shown in Fig. 1, indicating only the presence of random noise, by virtue of the fact that each of two coincidence detectors employed produced only occasional chance coincidences.
Figure 4:
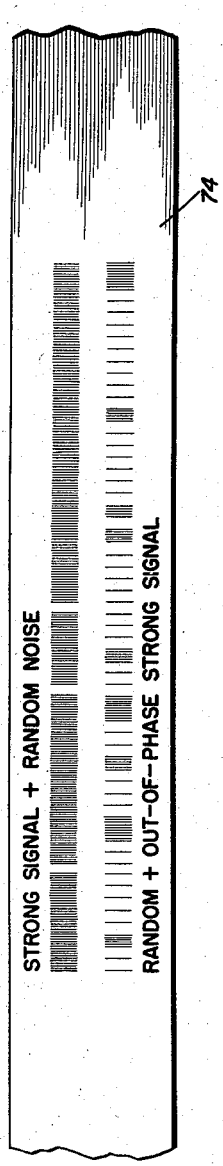
Fig. 4 is a view similar to Fig. 3, but wherein one of the two coincidence detectors has revealed many successive coincidences, thus indicating on the tape the existence of a coherent signal.
Figure 5:
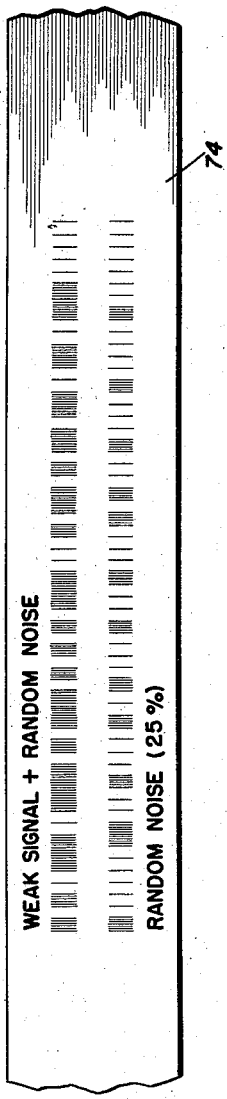
Fig. 5 is a diagrammatic view showing, on the tape, signal and noise from one coincidence detector and noise only from the other.

In Figs. 3, 4 and 5 different recordings of noise and signal coincidences appearing on two channels are shown on film such as the film 74. In Fig. 3, random coincidences of polarities, indicating only random noise are shown. Correlation is only of the order of 25 percent. On the basis of the recordings of Fig. 3, it could be assumed that no coherent signal was present in either channel. In Fig. 4, however, a strong signal and random noise are present in one channel, for example that of the coincidence detector receiving impulses from a directly oncoming wave front. In the other channel, which records coincidences from the coincidence detector receiving impulses from a "slanted" wave front, the strong signal will be out-of-phase and only random coincidences will be present. In Fig. 5, weak signal and random noise coincidences are present in one channel and only random noise in the other channel.

In view of the fact that the channels record polarity coincidences from wave fronts angularly displaced with respect to each other, it will not be possible for identical coincidences to be recorded simultaneously in both channels except, of course, in the event of saturation of the receptors by strong noise or signal impulses.

Figs. 6, 7 and 8 illustrate a modified embodiment of the invention, utilizing an electro-mechanical coincidence detector and recording apparatus for sampling signals and noise from three input sources, such as the three receptors shown in Fig. 2. In Figs. 6 and 7, a disk 90, of insulating material, is rotated at a constant speed by a motor (not shown). The disk 90 carries three radially spaced rows of headed contactors 92, 94 and 96, the contactors of each row being spaced annularly about the disk and being mounted for limited movement parallel to the axis of the disk.

Mounted at one side of the disk 90 and confronting three vertically spaced contactors of the rows 92, 94 and 96 are vertically aligned electromagnets 98, 99 and 100. Similar electromagnets similarly mounted at the opposite side of the disk 90 are shown at 101, 102 and 103. Pairs of conductors for each input channel are shown at 104, 105 and 106. Corresponding electromagnets at opposite sides of the disk are connected to corresponding pairs of the conductors 104, 105 and 106 through rectifiers. The rectifiers for the magnets 98, 99 and 100 are shown at 107 and being poled to respond to positive impulses, and the rectifiers for the magnets 101, 102 and 103 being indicated at 107a and being poled to respond to negative impulses. Thus, a negatively polarized impulse appearing simultaneously on the three pairs of conductors 104, 105 and 106 would energize the three electromagnets 101, 102 and 103, for shifting the three contactors confronting said magnets to the right, as viewed in Fig. 7. This action would take place in the event of a (negative) polarity coincidence.

In order to "read out" the results of the actions of the electromagnets in response to impulses appearing on the pairs of conductors 104, 105 and 106, switch groups are electrically connected in series and to recorder pens, to be described hereinafter. In more detail, the switch groups are shown at 108 and 108a.

The switches of the groups are normally open circuit single pole, single throw devices. The switches 108 and 108a are mounted in rows of three at opposite sides of the disk 90, and are supported by arcuate plates 110 and 112. The switches of each row are connected to the switches of the other rows by short conductors 114. For simplicity, only the switches to be discussed in an example of the operation of this modification have been shown interconnected. As best seen in Figs. 7 and 8, corresponding radial rows of switches 108 and 108a at opposite sides of the disk 90 are connected in series-parallel and to a battery and recording pen. Recording pens for producing records of coincidences from two wave fronts, i.e., a directly oncoming wave front and a "slanted" wave front, are shown in Fig. 8 at 116 and 118. Each of the pens includes a stylus 120, damped by a damper 122 and adapted to make a record on a moving tape 124. Batteries for operating the pens, and connected in series with conductors leading from the series-parallel connected switches 108, 108a, are shown at 126.

The operation of this embodiment of the invention will now be described. As previously stated, if three of the electro-magnets at one side of the disk 90 are simultaneously energized by a negative polarity coincidence, the contactors confronting said magnets will be moved to the right. After the disk has rotated through about 180 degrees, these shifted contactors will engage corresponding switches 108a, closing them and energizing the recorder pen connected with that set of switches, for recording the coincidence on the tape 124. In the event of a positive polarity coincidence appearing on the conductors 104, 105 and 106, the magnets 98, 99 and 100 will be energized, for shifting the confronting contactors 92 to the left (as viewed in Fig. 7). Switches 108, at the opposite side of the disk 90 from those operated as a result of a negative polarity coincidence, will be closed for energizing the recorder pen and recording the negative coincidence on the tape 124. In Fig. 8 the arrangement of switches 108, 108a connected to recorder pens 116 and 118, with batteries 126 in series, is shown. The switches connected to pen 116 are arranged so as to receive impulses, from a wave front or other source, which are shifted in time relative to the channels carried by conductors 104, 105 and 106. The switches connected to recorder pen 118 are arranged in vertical alignment, to receive impulses from a source and arriving simultaneously at the input channels carried by said conductors 104, 105 and 106. That is, the vertical and "slanted" arrangements of the switches 108, 108a correspond to the vertical and "slanted" arrangements of the take-off taps on the delay lines 34, 36 and 38 of Fig. 2.

As will be understood after a study of Figs. 7 and 8, polarity coincidence recordings will be effected only if three series connected switches 108, or three series connected switches 108a, are closed, and such circuit closures will not be completed unless there are three positive or three negative impulses in the channels carried by conductor pairs 104, 105 and 106. Thus, the apparatus of this modified embodiment of the invention functions to accomplish the recording of signal polarity coincidences in a manner corresponding to the operation of delay lines and diode coincidence detectors of Fig. 2.

It will be apparent that many modifications other than those illustrated and described may be made without departing from the scope of my invention as set forth in the appended claims.

What is claimed is:

1. An apparatus for testing for the existence of signals in the presence of overriding noise, comprising a plurality of antennas positioned in the paths of oncoming wave fronts, receptors connected with said antennas, delay lines connected to said receptors and having take-off taps, coincidence detectors connected to said take-off taps, and a recorder connected to each coincidence detector, one of said take-off taps being adjusted to render its associated coincidence detector responsive to wave front impulses having a given phase delay relationship with respect to the antennas, and another of said take-off taps being adjusted so that its associated coincidence detector will respond to impulses having another phase relationship to said antennas, said recorders recording instantaneous polarity coincidences of impulses appearing at said take-off taps.

2. An apparatus as recited in claim 1, wherein said coincidence detectors each includes a plurality of diodes coupled to said take-off taps.

3. An apparatus as recited in claim 1, including triodes coupling said coincidence detectors to said delay lines, and pairs of triodes coupling said coincidence detectors to said recorders, said coincidence detectors including diodes normally biased to prevent current flow in the anode circuits of the second mentioned triodes for preventing recorder operation, said bias being overcome by said impulses to permit recorder operation.

4. An apparatus as recited in claim 3, wherein said first mentioned triodes are connected as cathode followers.

5. An apparatus as recited in claim 3, wherein said recorders each include a photosensitive recording surface, and a lamp connected with each of said pairs of triodes, each of said lamps being illuminated by plate current flow in a pair of triodes upon the incidence of an impulse from the coincidence detector associated with said pair of triodes, for making a record on said surface.

6. An apparatus for testing for the existence of signals in the presence of overriding noise, comprising a plurality of pick-up means positioned in the paths of oncoming impulses, a plurality of delay means, said delay means having variable delay times and said pick-up means being connected to said delay means, coincidence detectors connected to said delay means, and a recorder connected to each coincidence detector, each of said delay means delivering to a coincidence detector impulses which register only when coincident in time, said coincident impulses registering on a recorder.

7. An apparatus as recited in claim 6, wherein said pick-up means is constituted by a plurality of antennas, and a receptor connected to each of said antennas.

8. In an apparatus for testing for the existence of signals in the presence of overriding noise, a plurality of antennas, receptors connected to said antennas, clippers connected to said receptors, tapped delay lines connected to the clippers, cathode followers connected to the taps of the delay lines, coincidence detectors coupled to the cathode followers, and recorders connected to the coincidence detectors.

References Cited in the file of this patent

UNITED STATES PATENTS

| | | |
|---|---|---|
| 1,463,386 | Carlson | July 31, 1923 |
| 1,740,833 | Ranger | Dec. 24, 1929 |
| 2,117,680 | Robinson | May 17, 1938 |
| 2,476,639 | Thomas | July 19, 1949 |
| 2,508,565 | Chance | May 23, 1950 |
| 2,510,139 | Purington | June 6, 1950 |
| 2,520,297 | Anderson | Aug. 29, 1950 |